H. W. FOSTER & L. C. HILL.
BURNER.
APPLICATION FILED NOV. 9, 1909.
1,047,028.
Patented Dec. 10, 1912.
Fig. 1.
Fig. 2.
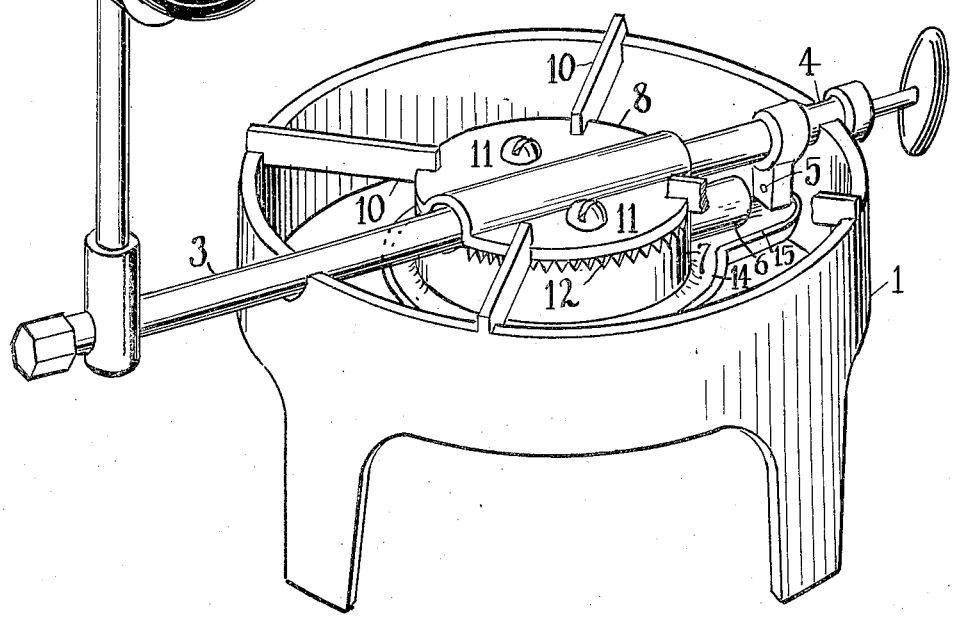
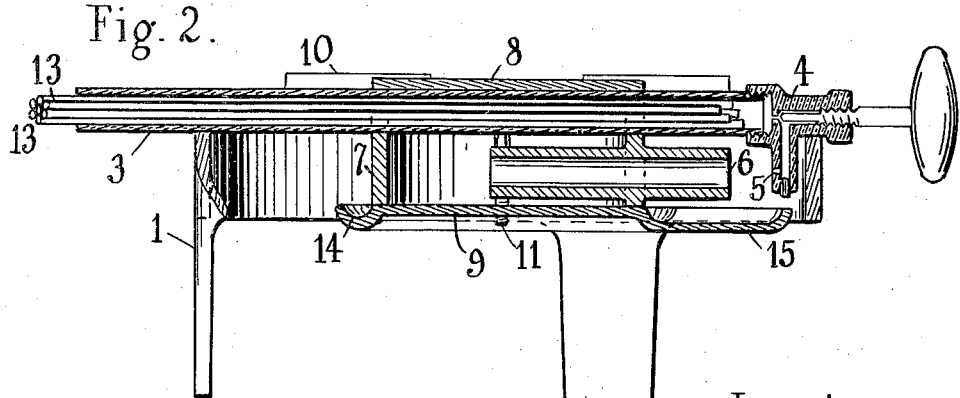
Witnesses:
Samuel W. Balch
Frank C. Cole
Inventors:
Harry Walter Foster,
Loyal Clement Hill,
by Thomas Ewing Jr.,
Attorney.

UNITED STATES PATENT OFFICE.

HARRY WALTER FOSTER AND LOYAL CLEMENT HILL, OF NEWARK, NEW JERSEY; SAID HILL ASSIGNOR TO SAID FOSTER.

BURNER.

1,047,028.  Specification of Letters Patent.  Patented Dec. 10, 1912.

Application filed November 9, 1909. Serial No. 526,958.

*To all whom it may concern:*

Be it known that we, HARRY WALTER FOSTER and LOYAL CLEMENT HILL, both citizens of the United States of America, and residents of Newark, in the county of Essex and State of New Jersey, have invented certain new and useful Improvements in Burners, of which the following is a specification.

The object of this invention is to provide a burner of simple and inexpensive construction suited for safe, cleanly and efficient heat generation from liquid fuel, as alcohol, and the operation of which is easily understood and carried out.

In the accompanying sheet of drawings which forms a part of this application, Figure 1 is a perspective of an alcohol stove constructed in accordance with our invention, and Fig. 2 is a vertical section of the same.

The stove has a suitable frame or stand 1 in the form of a circular band with legs which supports a reservoir 2 and a burner which comprises a conduit 3 leading from the reservoir through a valve 4 to a nozzle 5 where a Bunsen burner is formed by directing the jet from the nozzle into a mixing tube 6 which projects through the circular side walls 7 of a mixing chamber. The mixing chamber is cylindrical, being formed by the circular side walls, a top plate 8 and a bottom plate 9. The top plate is conveniently cast with ribs 10 10 serving as a grate on which articles to be heated are placed, and the ribs may be cast with the stand, thereby connecting the top plate of the mixing chamber with the stand. The circular walls of the mixing chamber are clamped by the top and bottom plates which are held in place by screws 11 11 passing through the top plate and tapping into the bottom plate. Notches 12 12 around the upper periphery of the circular side walls afford outlets for the gas where it ignites and the ring of flames surrounds the top plate.

The conduit leading from the reservoir to the nozzle passes through the mixing chamber in contact with the under surface of the top plate which is arched so as to partially inclose the conduit. It is heated by direct contact with the flame where it enters and leaves the mixing chamber and is also heated by conduction from the top plate. This portion of the conduit constitutes a vaporizing chamber. It contains closely packed parallel rods 13 13 which extend the surface for heat transfer and afford capillary interstices between which the liquid fuel is converted into vapor on its way to the nozzle. The lower plate of the mixing chamber extends beyond the circular side walls of the chamber and has its rim upturned, thereby forming a pan or gutter 14. A tongue 15 or branch from this gutter extends under the nozzle to receive the liquid drip on starting the burner, when it is cold and the fuel is not vaporized on its way to the nozzle.

On starting the burner, a small amount of the liquid fuel is drawn into the pan and ignited. When the preliminary burning of this has heated the vaporizing chamber of the conduit, the fuel comes from the nozzle in vaporized form and the jet is thrown thereafter through the air inlet to the mixing chamber, carrying therewith and mixing with the proper quantity of air. The mixed air and gas emerge from the notches in the periphery of the mixing chamber and take fire from the flame coming from the pan, and continue the combustion after the liquid fuel in the pan has been consumed.

What we claim as new, and desire to secure by Letters Patent, is—

1. As a new and improved article of manufacture, a vapor stove comprising a stand with legs, ribs serving as a grate and a central cover plate in one piece, a bottom and side walls forming with the cover plate a mixing chamber, a vaporizing chamber consisting of a conduit passing through the mixing chamber and held between the side walls and cover plate, and means for clamping together the cover plate and bottom, and thereby holding the side walls and conduit in place, substantially as described.

2. As a new and improved article of manufacture, a vapor stove comprising a stand with legs, ribs serving as a grate and a central cover plate in one piece, a bottom and side walls forming with the cover plate a mixing chamber which constitutes a burner head, a vaporizing chamber consisting of a separate conduit passing through the mixing chamber in contact with the underside of the cover plate, means for clamping together the cover plate and bottom, thereby holding the side walls and vaporizing chamber in place, and a nozzle fed from the conduit for directing a jet into the mixing chamber, substantially as described.

Signed by us at Newark, N. J., this 4th day of November, 1909.

HARRY WALTER FOSTER.
LOYAL CLEMENT HILL.

Witnesses:
FREDERICK G. BUCKLEY,
WILLIAM S. BAGAN.